United States Patent [19]
Van Der Koogh et al.

[11] 3,826,918
[45] July 30, 1974

[54] RADIATION-MEASURING INSTRUMENT WITH SURFACES SHIELDED AGAINST CONTAMINATION

[75] Inventors: Gerbrand Van Der Koogh; Antonius P. Bernards, both of Alkmaar, Netherlands

[73] Assignee: Reactor Centrum Nederland, The Hague, Netherlands

[22] Filed: Sept. 28, 1971

[21] Appl. No.: 184,409

Related U.S. Application Data
[63] Continuation-in-part of Ser. No. 179,351, Sept. 10, 1971, abandoned.

[30] Foreign Application Priority Data
Sept. 10, 1970 Netherlands.................... 7013369

[52] U.S. Cl................................ 250/343, 250/303
[51] Int. Cl. ........................................... G01n 23/02
[58] Field of Search ........ 250/44, 43.5 D, 43.5 MR, 250/83.6 FT, 343, 356, 358, 303

[56] References Cited
UNITED STATES PATENTS

| | | | |
|---|---|---|---|
| 2,898,497 | 8/1959 | Cartmell et al. .......... | 250/83.6 FT X |
| 3,015,729 | 1/1962 | Spaa et al. .................... | 250/83.6 FT |
| 3,110,803 | 11/1963 | Wilson ........................ | 250/43.5 MP |
| 3,180,990 | 4/1965 | Randall et al............. | 250/83.6 FT X |
| 3,508,047 | 4/1970 | Mott et al. ..................... | 250/43.5 D |
| 3,649,829 | 3/1972 | Randolph .................... | 250/43.5 MR |

Primary Examiner—Archie R. Borchelt
Attorney, Agent, or Firm—Cushman, Darby and Cushman

[57] ABSTRACT

Instruments for measurement of electromagnetic and /or corpuscular radiation in fluid media are liable to be contaminated by deposition of material from the fluid. The contamination of detectors, radiation sources or other vital surfaces in radiation measurement instruments is prevented by placing a porous window before the surfaces threatened by contamination and flowing a purging fluid through the porous window.

6 Claims, 5 Drawing Figures

3,826,918

RADIATION-MEASURING INSTRUMENT WITH SURFACES SHIELDED AGAINST CONTAMINATION

This is a Continuation-in-Part of application Ser. No. 179,351 filed Sept. 10, 1971, now abandoned.

The invention relates to a measuring instrument for the measurement of electromagnetic and/or corpuscular radiation, which instrument has one or more surfaces shielded against contamination.

In the most general sense, the invention is applicable to every detectable radiation in an environment fraught with the risk of contamination of the measuring instrument.

A gas monitor affords an example of measurement in a case where the measuring result formerly could not be utilized because of contamination of the measuring device during and after the passage of large quantities of radio-active gas.

Gas monitors are used for measuring the quantity of radio-activity in a gas current, for instance in the air of ventilation of a reactor building.

The monitor consists in principle of a vessel through which the gas to be measured is passed and in which a radiation detector is incorporated. The detector is connected with indicating, recording and/or integrating apparatus. In many cases the monitor is able to initiate automatic reactions such as stopping the ventilation or the reactor.

Radio-active substance is filtered out of the gas current before the latter passes into the measuring vessel.

Some radio-active gases give rise, when in process of decay, to solid daughter products which in turn are also radio-active. Before their decay the radio-active gases are not held in a filter for solid substances. A certain proportion of these daughter products, consisting of positively-charged ions, is deposited on the wall of the measuring vessel and the detector and may make the measuring result unserviceable.

In the case of a drain-off of radio-active gases during a brief period, the degree of contamination thus caused will be such that the monitor reading will certainly not drop back to the original value. In this case any action exerted automatically upon an integrated amount of activity will start below the stipulated limiting value and hence at too early a moment.

The gases which are most troublesome from the point of view of contamination are isotypes of krypton and xenon which are produced as a result of the fission of $U^{235}$ and other fissionable substances. These gases may be liberated through leakage from a reactor in which fissionable elements with a deficient canning are contained. It is of paramount importance that the momentary and the integrated gas activity be accurately measured during and after the occurrence of these particular conditions.

The invention aims at obviating the above-mentioned drawback and thus permitting, inter alia, the construction of better gas monitors. The invention is in the broadest sense applicable to measurement of or by means of electromagnetic and/or corpuscular radiation in gaseous and liquid media.

According to the invention the surface to be shielded is provided with means for establishing along its boundaries a protective, fluid boundary layer of a clean medium.

By fluid is meant both liquid and gaseous media. The protective boundary layer may flow past a detector, past a radiation source or past both a radiation source and a detector if radiation transmission techniques are applied. Parts of the measuring vessel are also to be regarded as protective surfaces. A protective boundary layer can easily be established.

Now it is possible, by way of example, to measure the radio-activity of a gas directly through a gas layer flowing in front of a detector. In this way no contamination of the detector can occur.

No intermixing of the protective gas with the possibly radio-active gas occurs before the detector is passed.

In case of measurements to be taken on gaseous fluids one may use either a gaseous or a liquid protective layer. Preference will in this case be given to a gaseous protective layer. If a liquid is used as protective layer it is essential that the gas or components thereof which may be deposited on the detector or radiation source shall not dissolve in the protecting liquid. Any solid substances which are separated out may only occur on the interfacial surface between gas and liquid or at any rate near the measuring vessel, detection device or radiation source. Gaseous and liquid protective layers are both applicable in the case of measurement to be carried out on liquids by means of radiation. In this case, however, the protective boundary layer used will preferably be a liquid one.

An example of an irradiation technique in which the invention can be applied, is the detection of soot in flue gases. The flue gas is in this case irradiated by means of a light-source. The radiation that is transmitted by the flue gas is measured with a detection device, the detection device and the radiation source being shielded against contamination or sooting by means of gas currents passing along the windows.

An embodiment which is particularly serviceable for measurements to be carried out on liquids is that in which a boundary layer is injected through a slit along the circumference of a flow-measuring vessel. If a liquid is used as protective layer the flow conditions can be so adjusted that no intermixing of the boundary layer and the liquid to be measured can occur. This embodiment is particularly well adapted, for instance, for measuring and supervising the content of radio-active substances in a flowing liquid.

It is similarly possible to measure, for instance, the content of solid substances with the aid of an irradiation technique. The detection device is in this case mounted on the outer side of the measuring vessel and measures the radiation through the wall. If a radiation source is used it should likewise be mounted on the outer side of the measuring vessel. In such cases the measuring vessel is equipped with windows permeable to radiation at the positions where the detector device and the radiation source are situated.

An extremely simple, reliable and cheap method is that of boundary layer injection through a porous wall. The detection device and the radiation source, if any, are in this case positioned on the outer side of a porous wall of a flow-measuring vessel. Protective gas is pressed through the wall of this vessel, which gas forms a protective stream passing along the porous wall of the vessel. This protective gas stream protects the wall of the vessel, the detection device and the radiation source against contamination due to components or deposits originating from the centrally flowing gas to be measured (see FIG. 1).

The porous material may be any sufficiently porous substance which is at the same time permeable to the radiation concerned.

Porous cellulose, cemented glass powder, porous earthenware, porous plastic fabric, asbestos fabric or glass-fibre fabric, etc. are examples of serviceable wall materials.

A particularly serviceable material is cellulose filter candle, as used for the filtering of liquids. An outstanding advantage of this material is its very low specific gravity, so that the radiation passing through or merging from the fluid to be measured undergoes but little weakening.

Another advantage of the material is that it can very easily be worked.

The sensibility of the measuring set-up (volume magnification) can be improved by mounting the detection elements centrally inside a number of vessels with porous walls through which the gas to be measured can pass. The vessels with porous walls are positioned inside a vessel with a non-porous wall having an inlet for protective gas (see FIG. 2).

A central set-up of detection elements in a gas monitor which has a still larger (and hence very large) volume for the gas under test, is obtained by the use of two successive porous walls around the detection elements inside a non-porous wall. The space between the detection elements and the first porous wall and the space between the second porous wall and the non-porous wall, is provided with an inlet duct for protective gas. The space between the two porous walls is provided with an inlet and an outlet duct for the gas to be measured (see FIG. 3 and FIG. 4).

The invention is elucidated in the following by reference to the five figures.

FIG. 1 gives a diagrammatic representation of a gas monitor to be used for measuring radio-active gases which have been liberated into the atmosphere in a reactor building as a result, for instance, of breakage of the casings of fissile elements.

A diagrammatic representation of a gas monitor with a higher sensibility in which the detection elements are mounted centrally inside a plurality of vessels with porous walls, is given in FIG. 2.

Figure 1:
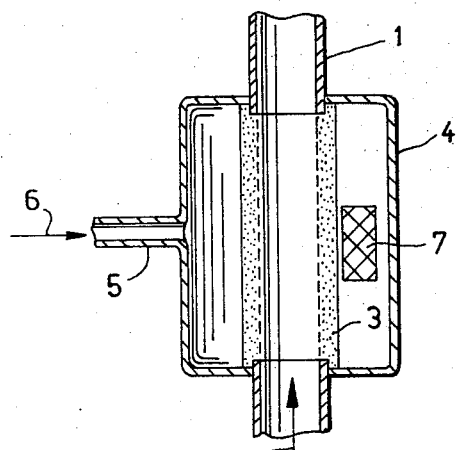

Item 1 in FIG. 1 represents a channel through which passes so-called foul air 2, i.e., air that has possibly become polluted with radio-active products. Item 3 represents a porous wall which is fairly permeable to radiation, which porous wall 3 is surrounded by a non-porous wall 4 having an inlet duct 5 for scavenging air 6 under a certain pressure above atmospheric.

Between walls 2 and 4 there is a detection device 7.

Figure 2:
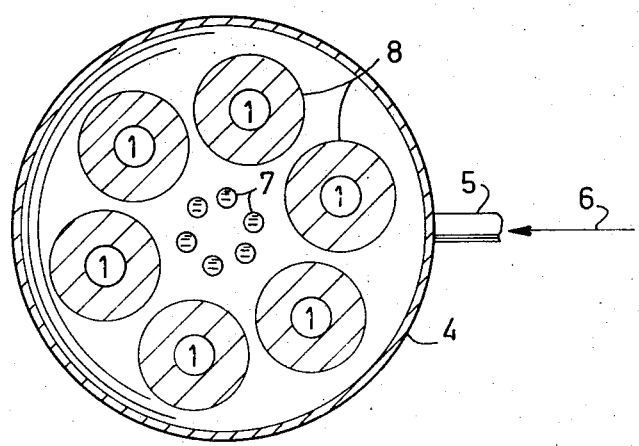

In FIG. 2, six porous pots 8 form six channels 1 through which flows the gas to be tested. Centrally positioned between the porous pots 8 are six detection devices 7. The porous pots 8 are surrounded by an impermeable vessel 4 having an inlet duct 5 for scavenging air 6.

Figure 3:
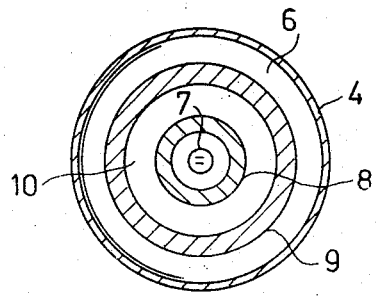
FIGS. 3 and 4 show respectively a horizontal and a vertical section of a gas monitor with a large gas volume and two porous walls.
Figure 4:
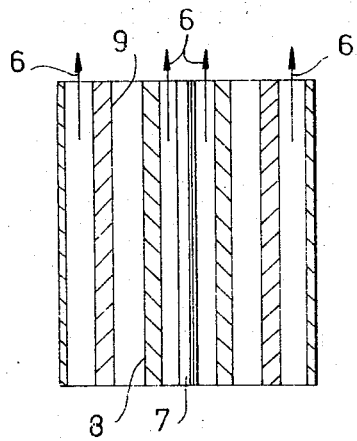

Item 7 in FIGS. 3 and 4 represents the detector, surrounded by two concentric porous walls 8 and 9, which latter are surrounded by the non-porous wall 4. Between the detector 7 and the porous wall 8, and between the porous wall 9 and the non-porous wall 4, the scavenging air passes under pressure into the measuring chamber. Walls 8 and 9 form a chamber 10 through which passes the foul air to be tested.

It is possible to use the space on the side from where the protective fluid is pressed through the porous wall for mounting additional apparatus. This has the advantage that with only one connection for protective liquid two or more types of measuring apparatus are shielded against contamination.

An example of such an apparatus is a gasmonitor for nuclear radiation which is provided with a smoke of fire detector.

Smoke can be detected for instance by means of the opacity of the ventilation air.

An other possibility is detection of the heat development. The heat development can be measured by the detection of rapid increases in temperature or by detection of heat radiation.

Figure 5:
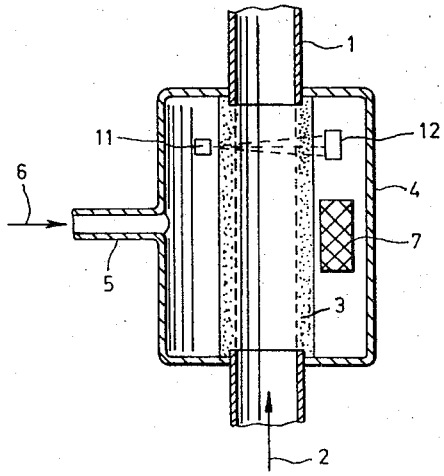
FIG. 5 is but a diagrammatic representation of the gas monitor of the present invention.

In FIG. 5 a description is given of a gasmonitor provided with a smoke detector.

In FIG. 5 by the item 11 a radiation source is represented, which radiates through the porous wall 3 and the foul air 2. The transmitted radiation is detected by an detecting organ for radiation 12. Smoke is in this case detected by less tranlucency of the foul air 2.

We claim:

1. A measuring device for the measurement of radiation of the electromagnetic or corpuscular type comprising:
    at least one vessel for containing a fluid having a wall made at least partially from porous material permeable to radiation;
    at least one detection device mounted adjacent and external of the porous wall; and
    means for pressing a protective fluid through the partly porous walls into said vessel to produce a protective fluid layer along the inner surface of the porous wall.

2. A measuring device according to claim 1, wherein the detection device is mounted on the external walls of the vessel.

3. A measuring device according to claim 1, including a plurality of said vessels each having a porous wall and each having inlet and outlet ducts for the fluid to be measured, a plurality of detection devices centrally positioned with respect to said vessels, said means for pressing the protective fluid including a non-porous housing surrounding said vessels and said detectors, and an inlet duct for introducing the protective fluid into the non-porous housing so as to press the protective fluid through the porous walls.

4. A measuring device according to claim 1, wherein the detection device is positioned inside a first porous wall so as to define therebetween a clearance, a second porous wall surrounding the first porous wall to define an intervening space, said means for pressing the protective fluid including a non-porous wall surrounding the second porous wall with a space therebetween, the intervening space between the first and second porous walls defining a duct for the fluid to be measured, the clearance between the detection device and the first porous wall and the space between the non-porous wall and the second porous wall defining a passage means for the protective fluid.

5. A measuring device according to claim 1, wherein there is an additional detecting device mounted on the outer side of the porous wall that detects properties other than electromagnetic or corpuscular radiation.

6. A measuring device according to claim 5, wherein the additional detecting device detects smoke.

* * * * *